US010066678B2

(12) United States Patent
Hodrus

(10) Patent No.: US 10,066,678 B2
(45) Date of Patent: Sep. 4, 2018

(54) HYDROSTATICALLY OPERATED CLUTCH SYSTEM

(71) Applicant: Schaeffler Technologies AG & Co. KG, Herzogenaurach (DE)

(72) Inventor: Erhard Hodrus, Karlsruhe (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 70 days.

(21) Appl. No.: 15/111,953

(22) PCT Filed: Dec. 9, 2014

(86) PCT No.: PCT/DE2014/200692
§ 371 (c)(1),
(2) Date: Jul. 15, 2016

(87) PCT Pub. No.: WO2015/110106
PCT Pub. Date: Jul. 30, 2015

(65) Prior Publication Data
US 2016/0356322 A1 Dec. 8, 2016

(30) Foreign Application Priority Data
Jan. 23, 2014 (DE) .................. 10 2014 201 262

(51) Int. Cl.
| F16D 25/08 | (2006.01) |
| F16D 25/04 | (2006.01) |
| F16D 29/00 | (2006.01) |
| F16D 48/02 | (2006.01) |
| F16D 48/06 | (2006.01) |
| F16D 23/12 | (2006.01) |

(52) U.S. Cl.
CPC ......... *F16D 25/088* (2013.01); *F16D 25/048* (2013.01); *F16D 29/005* (2013.01); *F16D 48/06* (2013.01); *F16D 48/066* (2013.01); *F16D 2023/123* (2013.01); *F16D 2025/081* (2013.01); *F16D 2048/0209* (2013.01); *F16D 2048/0218* (2013.01); *F16D 2048/0221* (2013.01); *F16D 2048/0269* (2013.01); *F16D 2500/1024* (2013.01); *F16D 2500/1025* (2013.01)

(58) Field of Classification Search
None
See application file for complete search history.

(56) References Cited

U.S. PATENT DOCUMENTS 7,857,113 B2 * 12/2010 Villata .................. F15B 7/06
192/85.51
8,172,059 B2 * 5/2012 Reuschel ............ F16D 25/088
192/85.55
(Continued)

FOREIGN PATENT DOCUMENTS

DE 19648739 4/1998
DE 19857707 6/1999
(Continued)

*Primary Examiner* — Jacob S. Scott
(74) *Attorney, Agent, or Firm* — Volpe and Koenig, P.C.

(57) ABSTRACT

A hydrostatically operated clutch system having a hydrostatic clutch actuator for hydrostatically operating a clutch, in particular a pulse separation clutch of a hybrid drive, such that the hydrostatic clutch actuator is combined with a valve arrangement which is to be opened actively and enables the clutch to be engaged rapidly.

10 Claims, 1 Drawing Sheet

(56) References Cited

U.S. PATENT DOCUMENTS

| | | | | |
|---|---|---|---|---|
| 2007/0080040 A1* | 4/2007 | Bader | ............... | F16D 25/088 |
| | | | | 192/85.51 |
| 2012/0217117 A1 | 8/2012 | Gramman et al. | | |
| 2013/0020169 A1* | 1/2013 | Eich | ............... | F16D 48/066 |
| | | | | 192/85.63 |
| 2014/0236406 A1* | 8/2014 | Ishida | ............... | B60W 10/02 |
| | | | | 701/22 |
| 2015/0096864 A1 | 4/2015 | Treder et al. | | |

FOREIGN PATENT DOCUMENTS

| | | |
|---|---|---|
| DE | 102013205237 | 10/2013 |
| DE | 102013207263 | 11/2013 |
| JP | 2013509540 | 3/2013 |

* cited by examiner

HYDROSTATICALLY OPERATED CLUTCH SYSTEM

BACKGROUND

The invention relates to a hydrostatically operated clutch system comprising a hydrostatic clutch actuator for the hydrostatic operation of a clutch, particularly a pulse separation clutch of a hybrid drive. The invention further relates to a method for operating such a hydrostatically operated clutch system.

A method and a device for adjusting a clutch characteristic of an automatically operated friction clutch is known from the German publication DE 10 2013 207 263 A1, comprising a clutch actuator with an actuating device comprising a fluid column between the master cylinder and a slave cylinder, with the clutch actuator comprising an air opening. A method for controlling an actuator system is known from the German patent publication DE 10 2013 205 237 A1 for the hydraulic activation of a clutch in which the actuator system comprises a master cylinder with a master piston, a return-flow container for receiving hydraulic fluid, a connecting opening between the return-flow container and the master cylinder, a hydrostatic actuator for controlling a position of the master piston, and a control device for controlling the hydrostatic actuator.

SUMMARY

The objective of the invention is to simplify the hydrostatic operation of a clutch, particularly a pulse separation clutch of a hybrid drive.

The objective is attained in a hydrostatically operated clutch system comprising a hydrostatic clutch actuator for the hydrostatic operation of a clutch, particularly a pulse separation clutch of a hybrid drive, in that the hydrostatic clutch actuator is combined with a valve device that can actively be opened, allowing a rapid closing of the clutch. The hybrid drive represents a drive which comprises a secondary drive, for example an electric machine, in addition to the primary drive, for example an internal combustion engine. The primary drive and the secondary drive may be used together or each alone for driving the motor vehicle equipped with said hybrid drive. The motor vehicle with the hybrid drive is also called a hybrid vehicle. The clutch is preferably arranged in the hybrid vehicle between the primary drive and the secondary drive. The primary drive can be separated from the drive train by opening the clutch. When the hybrid vehicle is driven exclusively by the secondary drive, within the scope of the so-called pulse start it is possible to add the primary drive while driving. By the valve device actively to be opened here advantageously a very rapid closing of the clutch is possible.

A preferred exemplary embodiment of the hydrostatically operated clutch system is characterized in that the clutch is embodied as a separating clutch with a pulse start function. The separating clutch is embodied as a normally closed clutch, which is closed in the idle state and is opened by the hydrostatic clutch actuator.

Another preferred exemplary embodiment of the hydrostatically operated clutch system is characterized in that the clutch is closed in an idle state by a spring device, particularly a disk spring device, and can be opened by a hydrostatic clutch actuator. The hydrostatic clutch actuator has proven advantageous within the scope of the present invention with regards to the structural space available in a hybrid vehicle. However, within the scope of the present invention it has also shown that the hydrostatic clutch actuator cannot close the clutch quickly enough. By the alleged disadvantage of an additional valve device the rapid closing of the clutch can be possible using a hydrostatic clutch actuator. By the combination according to the invention of the hydrostatic clutch actuator with the valve device actively to be opened the clutch can be closed completely in an extremely rapid fashion, for example within a few hundred milliseconds.

Another preferred exemplary embodiment of the hydrostatically operated clutch system is characterized in that the valve device is embodied and arranged such that the valve device allows a rapid pressure reduction at the master side. For example, a master cylinder with a master piston is arranged on the master side, which can be moved by an electric motor via a transmission and a piston rod assembly in the master cylinder. The master cylinder is connected via a hydrostatic path to a slave cylinder, in which a slave piston is arranged. The clutch can be actuated via the slave piston, particularly opened. The valve device to be opened actively is allocated for example to the master cylinder at the master side. The pressure in the master cylinder can rapidly be reduced by the valve device to be opened actively.

Another preferred exemplary embodiment of the hydrostatically operated clutch system is characterized in that the valve device comprises a clutch pressure connection and a tank connection, allowing a rapid pressure reduction for closing the clutch. The tank connection is connected to a reservoir, for example. The reservoir contains a hydraulic medium, for example impinged with ambient pressure.

Another preferred exemplary embodiment of the hydrostatically operated clutch system is characterized in that the clutch pressure connection and the tank connection of the valve device are closed by a valve piston in a closed position of the valve device. The valve piston is pre-stressed by a pre-stressing spring into its closed position, for example. By an electromagnetic operation, for example the valve piston can be moved out of its closed position into an opening position, in which the clutch pressure connection is connected to the tank connection.

Another preferred exemplary embodiment of the hydrostatically operated clutch system is characterized in that the valve piston limits an annular chamber radially at the inside, which annular chamber in the axial direction is limited by two seals and which is radially at the outside limited by a valve housing with a tank connection. The connections of the valve device are preferably embodied like or similar to an air hole in conventional clutch master cylinders. This way the pressure at the master side, particularly in the master cylinder, can be rapidly reduced via the opened valve device. Furthermore, the valve device according to the invention can perform diagnostics and shows very low leakage. Compared to valve devices according to the invention, simple and low-cost slide valves frequently show high leakage due to soiling. If necessary, pressure can develop in the master cylinder due to a motion of said master piston, which is then released in a targeted fashion by the valve device actively opened, which can be sensed for diagnostic purposes. This "diagnosing process" can be used for example to provide a signal when the system is activated that the clutch is available, particularly the pulse separation clutch.

In a method for operating an above-described hydrostatically operated clutch system, the above-stated objective is alternatively or additionally attained in that the opened clutch is closed rapidly by an active opening of the valve device. Here, for the active closing of the clutch intentionally the hydrostatical clutch actuator is not used, because it is too slow.

A preferred exemplary embodiment of the invention is characterized in that during the closing of the clutch a master cylinder is moved in the direction of a minimal position by the active opening of the valve device. The minimal position of the master piston is equivalent to the end position of the master piston.

Another preferred exemplary embodiment of the method is characterized in that the valve device remains open until the master piston has reached its minimal position. Only then the system regains full functionality. By keeping the valve device open it is advantageously prevented that a vacuum develops inside the master cylinder or erroneously air penetrates into the master cylinder, passing the seals.

BRIEF DESCRIPTION OF THE DRAWINGS

Additional advantages, features, and details of the invention are discernible from the following description, in which various exemplary embodiments are described in detail with reference to the drawings. Shown are.

DETAILED DESCRIPTION OF THE PREFERRED EMBODIMENTS

Figure 1:
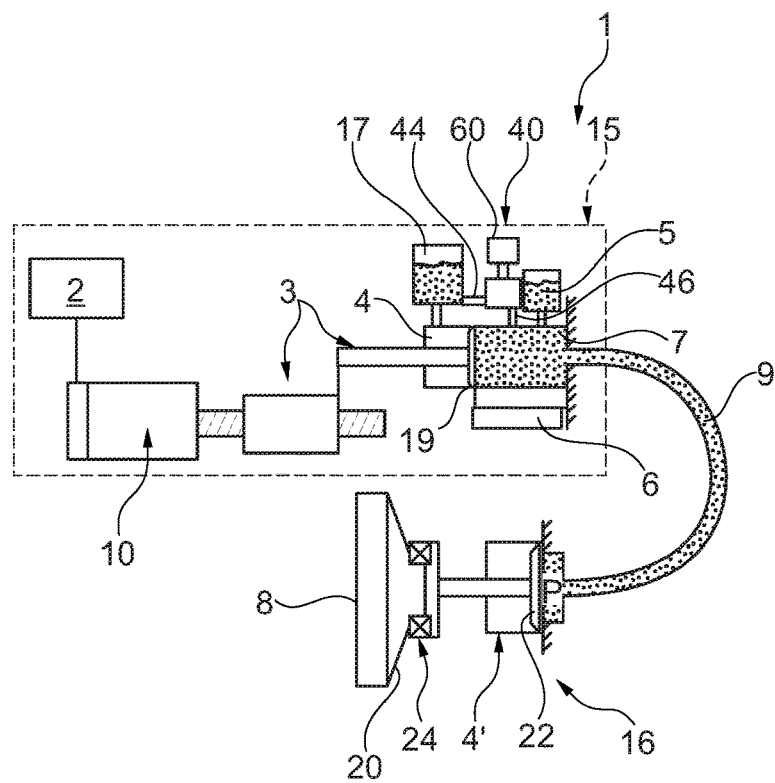
FIG. 1 a schematic illustration of a hydrostatic clutch system with a valve device to be opened actively, FIG. 2 a detailed illustration of the valve device of FIG. 1 to be actively opened in a closed position, and FIG. 3 a valve device of FIG. 2 in its opened position.

FIG. 1 shows schematically the design of the hydraulic clutch system 1 using the example of a schematically shown hydraulic, hydrostatic clutch actuator (HCA). A cylinder 4, also called master cylinder, is arranged on the master side 15 with a piston or master piston 19.

The hydraulic clutch system 1 comprises at the master side 15 a control device 2 as the control unit, which controls an actuator 3. When changing the position of the actuator 3 with respect to the output element of the actuator and thus the piston 19 in the cylinder 4 along the actuator path towards the right, the volume of the cylinder 4 is changed, causing a pressure P to be generated in the cylinder 4, which is transferred by pressure medium 7 via a hydraulic line 9 to the slave side 16 of the hydraulic clutch system 1.

The hydraulic line 9 is adjusted with regards to its length and shape to the situation of the structural space of the vehicle. At the slave side 16, the pressure P of the pressure medium (fluid) 7 results in a change of the path in a cylinder 4, which is also called the slave cylinder, of the piston position of a piston of slave piston 22 in the slave cylinder, which is transferred via an actuation bearing 24 to a clutch 8, in order to actuate it. The pressure P in the cylinder 4 at the master side 15 of the hydraulic clutch system 1 can be determined via a first sensor 5. The first sensor 5 preferably represents a pressure sensor.

The path traveled by the actuator 3 and/or the piston of the master cylinder along the actuator path is determined via a second sensor 6. The second sensor 6 can either represent a path sensor, which determines the path traveled by the actuator compared to a reference position, or preferably a sensor which determines the number of rotations of the actuator drive, which may represents an electric motor 10, for example, and determines therefrom the actuator path.

The cross-section of an air opening 18 for volume compensation is advantageously embodied with as little flow resistance as possible. The clutch 8 is embodied as a separating clutch and thus the spring device 20, particularly a disk spring device, is pre-stressed into its closed position.

A valve device 40 is allocated to the master cylinder 4. The valve device 40 is embodied as a pressure reduction valve 42, which allows rapid pressure reduction in the master cylinder 4 when needed. For this purpose, the pressure reduction valve 42 has a pressure reduction opening 44, which is also called the tank connection.

The pressure reduction valve 42 is connected via the pressure reduction opening 44 to the reservoir 17. Via an inlet opening 46 which is also called the clutch pressure connection, the pressure reduction valve 42 is connected to the master cylinder 4. The pressure reduction valve 42 is operated via an actuator 60.

In a closed condition of the pressure reduction valve 42 the connection is interrupted between the master cylinder 4 and the reservoir 17. In a state of the pressure reduction valve 42 operated by the actuator 60 the connection is released by the pressure reduction valve 42 between the input opening and/or the pressure connection or the clutch pressure connection 46 and the pressure reduction opening and/or the tank connection 44.

In the open state of the pressure reduction valve 42, in order to provide a rapid pressure reduction in the hydraulic cylinder 4, pressure medium or hydraulic medium 7 reaches from the master cylinder 4 via the inlet opening 46 and the pressure reduction opening 44 of the pressure reduction valve 42 into the reservoir 17. This way the clutch 8 can be closed most rapidly, for example within fifty milliseconds, with the help of a disk spring device 20.

Figure 2:
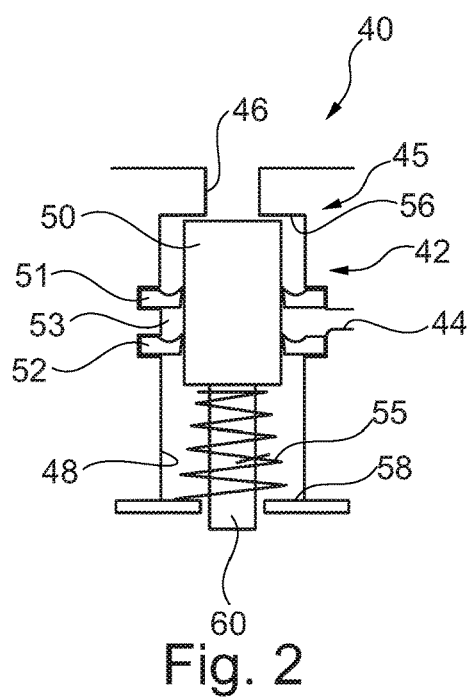
Figure 3:
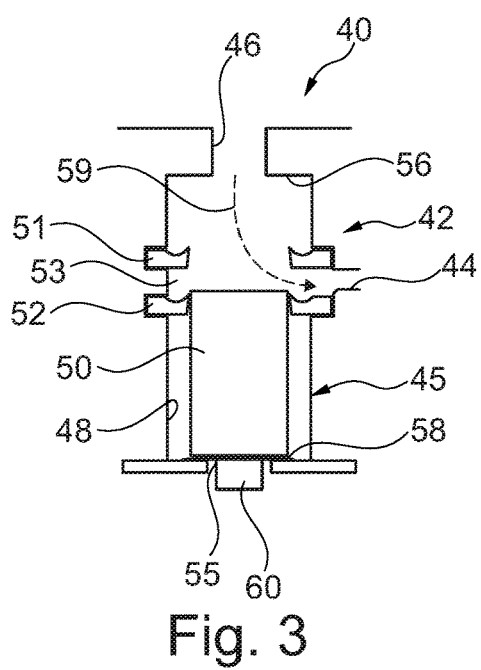

FIGS. 2 and 3 show in a simplified fashion the valve device 40 with a pressure reduction valve 42 for implementing an additional pressure reducing function. The pressure reduction valve 42 comprises a pressure reduction opening 44 in a valve housing 45 of the valve device 40.

The pressure can be reduced via the pressure reduction opening 44 into a low pressure area or into a hydraulic medium reservoir (17 in FIG. 1), which is impinged with low pressure or ambient pressure. The valve housing 45 further comprises an inlet opening 46, which is also called clutch pressure connection.

The valve housing 45 comprises a receiving chamber space 48, in which a valve piston 50 is accepted, capable to move back and forth. Two seals 51, 52 are allocated to the valve piston 50 in a similar fashion as in a master cylinder with an air hole. The seals 51, 52 are axially fixed in the valve housing 45.

Here, the seals 51, 52 are embodied as annular seals, which show radially at the inside a sealing lip, which as discernible in FIGS. 2 and 3 contacts the valve piston 50. The seals 51, 52 limit an annular chamber 53 in the axial direction, which is limited radially at the inside by the valve piston 50. Radially at the outside the annular chamber 53 is limited by the valve housing 45. A pressure reduction opening 44 extends from the annular chamber 53.

The valve piston 50 is pre-stressed by a closing spring 55 into its closed position shown in FIG. 2. In the closed position shown in FIGS. 2 and 3 the valve piston 50 impinges with its upper end a closing stop 56, which is embodied at the valve housing 45. Here, the closing spring 55 rests on an opening stop 58 which is also provided at the valve housing 45. The valve piston 50 can move back and forth in the axial direction between the two stops 56 and 58, thus in FIGS. 2 and 3 upwards and downwards.

In the closed position shown in FIG. 2 the valve piston 50 closes the pressure reduction opening 44. In FIG. 3 the valve piston 50 is shown in its opened position. In the opened position, the valve piston releases a connection between the inlet opening 46 and the pressure reduction opening 44, so that pressure can be reduced via the pressure reduction opening 44 as indicated in FIG. 3 by an arrow 59.

The valve piston 50 is actuated electrically by an actuator 60. When electrifying the actuator 60, a force is applied by the actuator 60 upon the valve piston 50, directed downwards in FIGS. 2 and 3. This force acts opposite the closing force of the closing spring 55.

When the actuator 60 is switched to a non-energized state, the actuator 60 applies no pressure upon the valve piston 50. In the non-energized state of the actuator 60, the valve piston 50 is pre-stressed by the closing spring 55 into its closed position.

In FIG. 2 the pressure reduction valve 42 is closed. The closing spring 55 also called pre-stressing spring keeps the non-energized pressure reduction valve 42 in the closed state. When the pressure reduction valve 42 is electrified, a force acts upon the actuator 60 and/or a piston rod assembly upon the valve piston 50 such that the pressure reduction valve 42 is opened.

FIG. 3 shows the pressure reduction valve 42 in its open position. An arrow 59 indicates how pressurized hydraulic medium is released from the master cylinder through the inlet opening 46, passing the open valve piston 50, through the pressure reduction opening 44 into the reservoir.

During operation, the function of the pressure reduction valve 42 can be checked easily. For example, via the hydrostatic clutch actuator 3 and the master piston 19 a pressure can be generated in the master cylinder 4 for diagnostics purposes, which is then released by the pressure reduction valve 42.

Here, the actuator 60 is switched to a non-energized state for diagnostics purposes, in order to check if the pressure in the master cylinder 4 is reduced immediately, as expected, via the pressure reduction opening 44.

If that is the case, this information can be used for example when starting up the system in order to generate a signal "pulse separation clutch available". In case of the valve piston 50 being stuck, this can be saved and indicated in an error memory of the control device (2 in FIG. 1). Independent from the diagnostics function which is optional the pressure reduction valve 42 shows very low leakage.

When an error occurs, i.e. when the hydrostatic clutch actuator 3 is defective because the transmission or the spindle cannot move any more, the clutch shall remain in its present position. In particular, the clutch shall not be closed again. In case of such an error, the master piston 19 is located in the position necessary for the maximum opening of the clutch. The slave piston 22 is then also in the position necessary for the maximum opening of the clutch.

By an active opening of the pressure reduction valve 42 the hydraulic medium 7 can be drained from the master cylinder 4 into the reservoir 17. The slave cylinder 22 is pressed by the retention force of the disk spring into its minimal position. The master piston 19 is still in its maximum position.

After the pressure in the master cylinder 4 has dropped, the pressure reduction valve 42 must remain open in order to allow the exchange of hydraulic medium with the reservoir 17 when the master cylinder 19 is displaced from the maximum to the minimum position, the master cylinder 4 must now be filled with hydraulic medium. If the pressure reduction valve 42 was not opened, a vacuum would develop in the master cylinder 4 or erroneously air would enter past the seals, which is undesired.

LIST OF REFERENCE CHARACTERS 1 hydrostatically operated clutch system
2 control device
3 hydrostatic clutch actuator
4 cylinder
5 first sensor
6 second sensor
7 pressure medium
8 clutch
9 hydraulic line
10 electric motor
11
12
13
14
15 master side
16 slave side
17 reservoir
18 air opening
19 master piston
20 disk spring device
21
22 slave piston
23
24 actuator bearing
25
26
27
28
29
30
31
32
33
34
35
36
37
38
39
40 valve device
41
42 Pressure reduction valve
43
44 Pressure reduction opening
45 Valve housing
46 Inlet opening
47
48 receiving space
49
50 valve piston
51 seal
52 seal
53 annular chamber
54
55 closing spring
56 closing stop
57
58 opening stop
59 arrow
60 actuator

The invention claimed is:

1. A hydrostatically operated clutch system, comprising a hydrostatic clutch actuator for hydrostatic operation of a clutch, the hydrostatic clutch actuator is combined with a valve device that is actively opened, which allows a closing of the clutch, wherein the valve device comprises a clutch pressure connection and a tank connection, allowing a pressure reduction for closing the clutch.

2. The hydrostatically operated clutch system according to claim 1, wherein the clutch is a separating clutch with a pulse start function.

3. The hydrostatically operated clutch system according to claim 1, further comprising a spring device, the clutch is closed in an idle state by the spring device, and is opened by the hydrostatic clutch actuator.

4. The hydrostatically operated clutch system according to claim 1, wherein the valve device provides a pressure reduction on a master side.

5. The hydrostatically operated clutch system according to claim 1, wherein the clutch is closed within 50 milliseconds.

6. The hydrostatically operated clutch system according to claim 1, wherein the clutch pressure connection and the tank connection of the valve device are closed in a closed position of the valve device by a valve piston.

7. The hydrostatically operated clutch system according to claim 6, wherein the valve piston delimits radially inwardly an annular chamber, which is limited in an axial direction by two seals, and is limited radially outwardly by a valve housing with the tank connection.

8. A method for operating the hydrostatically operated clutch system of claim 1, comprising closing the open clutch by an active opening of the valve device.

9. The method according to claim 8, further comprising when closing the clutch, by the active opening of the valve device, moving a master piston in a direction of a minimum position.

10. The method according to claim 9, wherein the valve device remains open until the master piston has reached its minimum position.

* * * * *